(12) United States Patent
Adachi

(10) Patent No.: US 7,050,242 B2
(45) Date of Patent: May 23, 2006

(54) ZOOM LENS AND AN IMAGING APPARATUS

(75) Inventor: Nobuyuki Adachi, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 10/832,298

(22) Filed: Apr. 27, 2004

(65) Prior Publication Data

US 2004/0212898 A1    Oct. 28, 2004

(30) Foreign Application Priority Data

Apr. 28, 2003    (JP)    ............... 2003-123088

(51) Int. Cl.
*G02B 15/14* (2006.01)

(52) U.S. Cl. ...................... 359/689; 359/676

(58) Field of Classification Search ................ 359/676, 359/680, 686, 689
See application file for complete search history.

(56) References Cited

U.S. PATENT DOCUMENTS

| | | | |
|---|---|---|---|
| 5,969,878 A | 10/1999 | Koizumi | 359/682 |
| 6,804,064 B1 * | 10/2004 | Hirakawa | 359/682 |
| 2001/0013979 A1 | 8/2001 | Koreeda | 359/680 |

* cited by examiner

*Primary Examiner*—Scott J. Sugarman
*Assistant Examiner*—Darryl J. Collins
(74) *Attorney, Agent, or Firm*—Oblon, Spivak, McClelland, Maier & Neustadt, P.C.

(57) ABSTRACT

A zoom lens is disclosed to comprise sequentially from an object side, a first lens group having an negative refracting power, and being movable back and forth along with an optical axis when a zooming rate is changed, a second lens group having a positive refracting power, and being movable to the object side along with the optical axis when the zooming rate is changed from a wide-end to a tele-end; and a third lens group movable back and forth along with the optical axis, and having a positive refracting power. In such zoom lens, the second lens group includes sequentially from the object side, an iris, one piece of convergent lens where at least a surface facing to the object side is an aspherical surface and an adhered three pieces of lenses.

6 Claims, 12 Drawing Sheets

FIG.6

| FACE No. | R | D | Nd | Vd |
|---|---|---|---|---|
| S1 | 251.3479 | 1.2 | 1.8830 | 40.8 |
| S2 | 7.8397 | 0.2 | 1.5342 | 41.7 |
| S3 | 7.0211 | 1.59 | | |
| S4 | 10.9902 | 2.2 | 1.7618 | 26.6 |
| S5 | 65.0000 | A1 | | |
| IRIS | INFINITY | 0.7 | | |
| S7 | 7.4028 | 1.8 | 1.8061 | 40.7 |
| S8 | -40.9898 | 0.15 | | |
| S9 | 28.0701 | 0.45 | 1.8467 | 23.8 |
| S10 | 8.7622 | 2.1 | 1.7725 | 49.6 |
| S11 | -7.5173 | 0.45 | 1.6200 | 36.3 |
| S12 | 4.4265 | B2 | | |
| S13 | 24.8482 | 1.9 | 1.5831 | 59.5 |
| S14 | -24.0304 | C3 | | |
| S15 | INFINITY | 0.92 | 1.4585 | 67.8 |
| S16 | INFINITY | 0.9 | | |
| S17 | INFINITY | 0.5 | 1.5688 | 56.0 |
| S18 | INFINITY | | | |

| | K | A | B | C | D |
|---|---|---|---|---|---|
| S3 ASPERIC SURFACE | 0 | -3.52018E-04 | -4.04058E-06 | 1.65900E-08 | -3.00164E-09 |
| S7 ASPERIC SURFACE | 0 | -3.39201E-04 | 3.52042E-06 | -1.44407E-06 | 3.07697E-08 |
| S8 ASPERIC SURFACE | 0 | 1.14470E-04 | 1.96120E-05 | -3.57664E-06 | 1.41133E-07 |
| S13 ASPERIC SURFACE | 0 | 2.38029E-04 | -1.15855E-06 | -1.7577E-07 | 6.50106E-10 |
| S14 ASPERIC SURFACE | 0 | 4.05253E-04 | -8.36463E-06 | 6.19261E-08 | -1.62861E-09 |

| SPACE BETWEEN LENS GROUP | WIDE END | INTERMEDIATE FOCAL DISTANCE | TELE END |
|---|---|---|---|
| A1 | 15.26 | 6.32 | 1.2 |
| B2 | 6.03 | 12.15 | 22.11 |
| C3 | 3.3 | 2.92 | 1.6 |

FIG.11

| FACE No. | R | D | Nd | Vd |
|---|---|---|---|---|
| S1 | 439.0000 | 1.2 | 1.8830 | 40.8 |
| S2 | 7.9000 | 0.2 | 1.5342 | 41.7 |
| S3 | 7.0000 | 1.55 | | |
| S4 | 11.0900 | 2.2 | 1.7552 | 27.5 |
| S5 | 81.2000 | A1 | | |
| IRIS | INFINITY | 0.7 | | |
| S7 | 7.3886 | 1.8 | 1.8061 | 40.7 |
| S8 | -56.6343 | 0.15 | | |
| S9 | 25.1100 | 0.45 | 1.8467 | 23.8 |
| S10 | 8.6720 | 2.2 | 1.7725 | 49.6 |
| S11 | -7.4700 | 0.45 | 1.6200 | 36.3 |
| S12 | 4.4800 | B2 | | |
| S13 | 26.8048 | 2 | 1.5831 | 59.5 |
| S14 | -22.3912 | C3 | | |
| S15 | INFINITY | 0.44 | 1.4585 | 67.8 |
| S16 | INFINITY | 0.9 | | |
| S17 | INFINITY | 0.5 | 1.5688 | 56.0 |
| S18 | INFINITY | | | |

| | K | A | B | C | D |
|---|---|---|---|---|---|
| S3 ASPERIC SURFACE | 0 | -3.79781E-04 | -3.03837E-06 | -2.52751E-08 | -2.42777E-09 |
| S7 ASPERIC SURFACE | 0 | -2.31537E-04 | 1.62745E-05 | -2.15654E-06 | 1.41677E-07 |
| S8 ASPERIC SURFACE | 0 | 2.36000E-04 | 3.35865E-05 | -4.22227E-06 | 2.70350E-07 |
| S13 ASPERIC SURFACE | 0 | 2.11687E-04 | -9.58594E-06 | 1.36036E-07 | -4.90641E-09 |
| S14 ASPERIC SURFACE | 0 | 4.07374E-04 | -1.89444E-05 | 3.37825E-07 | -6.42769E-09 |

| SPACE BETWEEN LENS GROUP | WIDE END | INTERMEDIATE FOCAL DISTANCE | TELE END |
|---|---|---|---|
| A1 | 15.59 | 6.24 | 2.26 |
| B2 | 5.923 | 11.93 | 19.16 |
| C3 | 3.28 | 2.99 | 1.97 |

FIG.12

|  |  | FIRST EMBODIMENT | SECOND EMBODIMENT |
|---|---|---|---|
| ① | $\nu$ | 59.5 | 59.5 |
| ② | $\lambda 5\%$ | 320nm | 320nm |
| ③ | $(\beta 2t \cdot \beta 3w)/(\beta 2w \cdot \beta 3t)$ | 2.3 | 2.31 |
| ④ | $2.2 < f3/fw < 3.0$ | 2.61 | 2.61 |

ZOOM LENS AND AN IMAGING APPARATUS

CROSS REFERENCE TO RELATED APPLICATION

This application claims priority from Japanese Priority Document No. 2003-123088, filed on Apr. 28, 2003 with the Japanese Patent Office, which document is hereby incorporated by reference.

BACKGROUND OF THE INVENTION

1. Field of the Invention

The present invention relates to a zoom lens and an imaging apparatus, and particularly to a zoom lens having a F number of around 2.8 in brightness, a zoom ratio of around 3 times, and a shorter overall length when retracted and being suitable for a digital still camera, a video camera and the like, and imaging apparatus using such zoom lens.

2. Description of the Related Art

In recent years, a video camera and a digital still camera using a solid state image sensing device have been widely spread rapidly, and high resolution and further miniaturization of those apparatus have been particularly demanded. A zoom lens which has zoom lens construction of negative, positive, and positive types from an object side, and a first lens group having a small number of lenses such as two pieces of concave and convex lenses is disclosed in the patent document 1 and the patent document 2 as a conventional technology.

Patent document 1: Japanese Patent Laid-Open No. 2001-296475

Patent document 2: Japanese Patent Laid-Open No. 2002-372667

However, it is very difficult to obtain a zoom lens for 5000000 pixel-class by applying such conventional technology, because miniaturization of lens is difficult, and further, it is difficult to satisfy a demand for high resolution accompanying with miniaturization of a picture size in an imaging device. Further by chasing miniaturization and high resolution of lens, an influence to a focusing performance by decentering between lenses of the second lens group becomes large, and it becomes difficult to accomplish an improvement in reliability.

SUMMARY OF THE INVENTION

The present invention was made to solve above mentioned problem. In other words, according to the present invention, a zoom lens includes sequentially from an object side, a first lens group having an negative refracting power and movable back and forth along with an optical axis when a zooming rate is changed, a second lens group having a positive refracting power and movable to the object side along with an optical axis when the zooming rate is changed from a wide-end to a tele-end, and a third lens group having a positive refracting power and movable back and forth along with an optical axis, wherein the second lens group includes from the object side, an iris, a piece of convergent lens having an aspherical surface at its object side, and an adhered three pieces of lenses. Further in the zoom lens as mentioned above, the first lens group comprises a diverging meniscus lens having a complex aspherical surface facing to an image plane, and a convergent lens. In addition, the third lens group includes a piece of convergent lens where at least a surface facing to the object side is an aspherical surface.

The present invention also relates to an imaging apparatus having the above mentioned zoom lens.

According to the present invention, in a zoom lens having first to third lens groups of negative, positive, and positive types sequentially from an object side, the second lens group is able to be configured to have sequentially from the object side, an iris, a piece of convergent lens where at least a surface facing to the object side is an aspherical surface, and an adhered three pieces of lenses, so that it is able to effectively carry out a correction of aberration by the piece of convergent lens having an aspherical surface. In addition, it is possible to improve a positioning accuracy of the three pieces of lenses when compared to a conventional one comprising a doublet and a single lens, to suppress the increase of a decentering sensitivity along with a miniaturization, and to form a lens system which is easily assembled.

BRIEF DESCRIPTION OF THE DRAWINGS

FIG. 6 is a chart showing a specification of a zoom lens concerning the first example;

FIG. 11 is a chart showing a specification of a zoom lens concerning the second example; and FIG. 12 is a chart showing numerical examples corresponding to the conditional equations 1 to 4 in each of examples.

DETAILED DESCRIPTION OF THE PREFERRED EMBODIMENT

Figure 1:
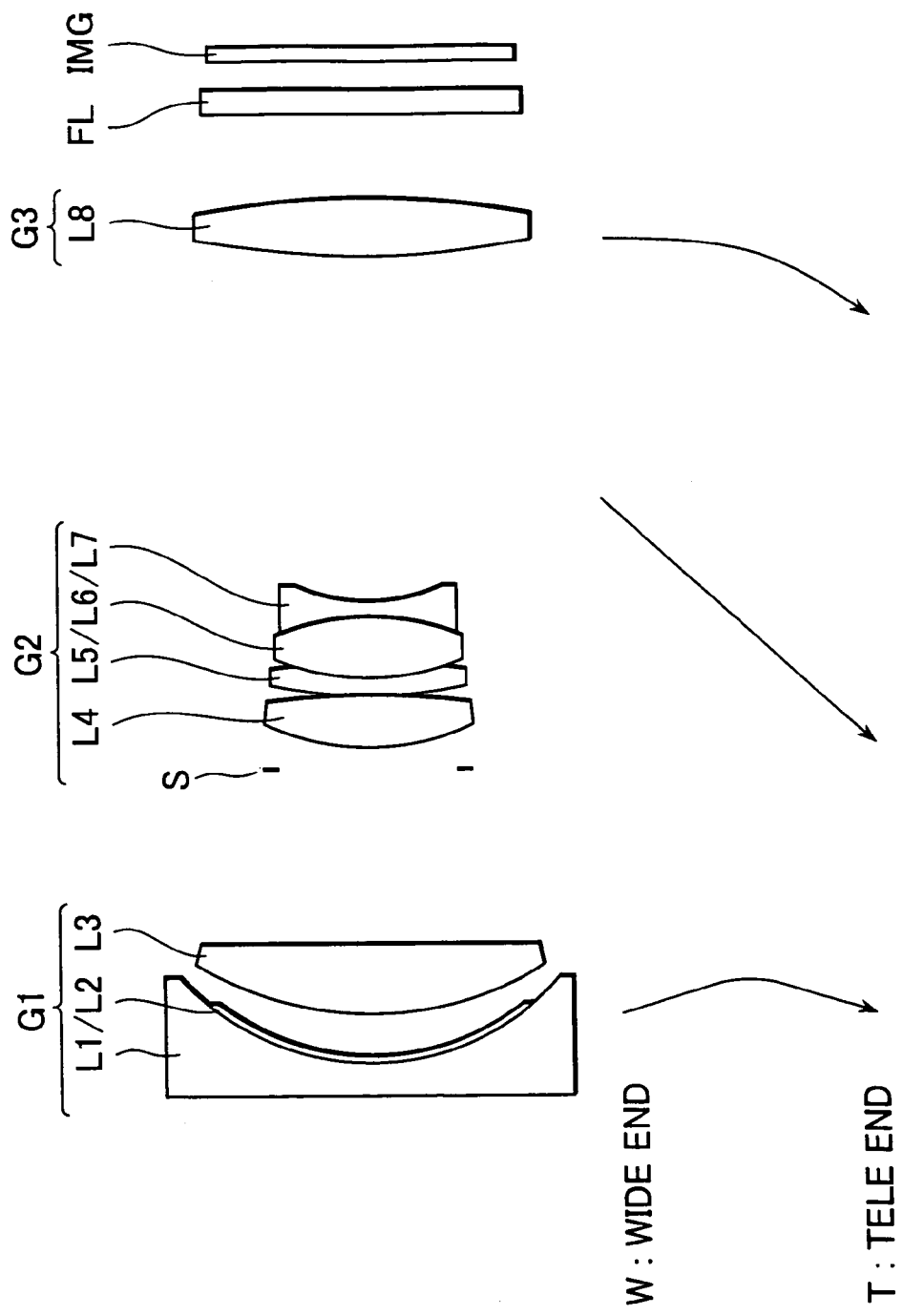
FIG. 1 is a chart explaining a zoom lens concerning the present embodiment.

Detailed description of the preferred embodiment of the present invention is explained based on attached drawings as follows. FIG. 1 is a chart explaining one embodiment of a zoom lens of the present invention. This zoom lens is principally applied to an imaging apparatus such as digital still cameras. At first, the zoom lens of this embodiment is described.

The zoom lens of this embodiment comprises sequentially from an object side, a first lens group G1 having an negative refracting power and movable back and forth along with an optical axis when a zooming rate is changed, a second lens Group G2 having a positive refracting power movable towards the object side along with an optical axis when the zooming rate is changed from a wide-end to a tele-end, and a third lens Group G3 movable back and forth along with an optical axis, and having a positive refracting power.

In such zoom lens of this embodiment, the second lens group G2 is configured to include sequentially from the object side, an iris S, a piece of convergent lens L4 where at least a surface facing to the object side is an aspherical surface, and an adhered three pieces of lenses L5, L6, and L7.

In addition, the first lens group G1 is configured to include an negative meniscus lenses L1 and L2 having a complex aspherical surface at an image plane side, and a convergent lens L3. Even more, the third lens group G3 includes a piece of a convergent lens L8 having at least one or more of aspherical surfaces. Still further, it is possible to have more desirable zoom lens if the convergent lens L8 of the third lens group G3 satisfies the following conditional equation.

$$n>1.5 \text{ and } 45<v<70 \qquad 1$$

n: D-line refractive index of glass material of an original lens used for the third lens group.

v: Abbe's number of glass material of an original lens used for the third lens group.

Now, detail of the present embodiment is described. When a zooming rate is changed in this zoom lens, each of lens groups moves as shown by arrows in FIG. 1, however, the second lens group G2 having a positive refracting power mainly shares many of zooming rate. In this case, a shift of a focal point is compensated by moving the negative first lens group G1 back and forth along with an optical axis from a wide-end W to a tele-end T, and by moving the positive third lens group G3 back and forth along with the an optical axis relative to an image plane IMG.

The first lens group G1 of the zoom lens according to the present embodiment has a large quantity of refraction of an off-axis principal ray, particularly at the wide-end W, so that larger astigmatism and distortion aberration tend to occur. Then, according to the present embodiment, it is designed to have a concave-convex configuration preceded by a concave lens for accomplishing a miniaturization of a lens system, and an aspherical surface of resin at the image plane side of an negative lens, that is, so-called hybrid aspherical surface is provided.

It is able to increase types of the glass material to be selected, and to compensate well an astigmatism and distortion aberration by providing such hybrid aspherical surface at this portion while keeping a cost merit. As a result, the first lens group G2 is able to be configured to have a simple construction of two pieces of lenses, and it is possible to accomplish a miniaturization of the lens system as a whole.

Even more particularly, when a complex aspherical lens is fabricated by a method utilizing an ultraviolet hardening technology, glass material used for the first lens group G1 is required to have high transmission rate for an ultraviolet ray. For example, as for the transmittance characteristic, it is desirable that the wavelength of the ultraviolet ray functioning a transmittance of 5%, that is, the wavelength ($\lambda$ 5%) is less than 350 nm.

$$\lambda 5\% < 350 \text{ nm} \qquad 2$$

In addition, in a convergent lens L4 (a convex lens) located in the most object side of the second lens group G2, it is desirable to provide an aspherical surface at least in the object side. In case of zoom lens preceded by an negative group, a luminous flux from the first lens group G1 becomes diverging luminous flux, so that the thickest luminous flux effectively goes through the convergent lens L4 located in the vicinity of the iris S positioned in the most object side of the second lens group G2. Therefore, it becomes possible to effectively carry out the correction of spherical aberration by using an aspherical surface here. In addition, it is desirable that this convergent lens L4 has a convex surface relative to the iris S. Because if the convergent lens L4 has a concave surface, the luminous flux is diverging further, and this invites the increase of the diameter of the second lens group G2.

In addition, the reason why the position of the iris S is located in the most object side of the second lens group G2 is that the iris S is preferably positioned far from the image plane IMG because the incident angle on an imaging device is preferably made shallow, and that it is possible to accomplish a miniaturization because a space of the object side from the iris S is shared with an interval of lens groups compared to the case where the iris S is located between lenses of the second lens group G2. Further, there is an effect to suppress the increase of the external diameter of lens in the first lens group G1 by bringing the position of an incident pupil at the wide-end close to the object side.

Among the second lens group G2, three pieces of lenses (adhered three pieces of lenses L5, L6, and L7) are disposed to the rearward of the preceding convergent lens L4 (a convex lens). In the case of a zoom lens preceded by negative lens group, an off-axis luminous flux passes a higher position above the optical axis in the first lens group G1, enters into the second lens group G2, and then passes a lower position in the vicinity of the iris S. After that, the off-axis luminous flux again passes a higher position through the second lens group G2 to the third lens group G3, so that various aberrations are compensated by using three pieces of lenses.

The aberration correction for the luminous flux on the optical axis is shared by a convex lens having aspherical surface of the second lens group G2, and the aberration correction for the off-axis luminous flux is shared by the complex aspherical surface of the first lens group G1 and the three pieces of lenses in the second lens group G2. However, when three pieces of lenses are used for the correction, if the optical system is attempted to be more compact, it is necessary to share the more power with the second lens group G2, and accordingly, the decentering sensitivity of the component lenses is inevitably increased. Accordingly, in the embodiment of the present invention, the measures are taken by utilizing the adhered three pieces of lenses L5, L6, and L7 using three pieces of lenses in order to absorb a mechanical assembling error of the lenses.

It is desirable that a ratio of zooming rate which the second lens group G2 shares satisfies the following conditions.

$$2.0 < (\beta 2t \cdot \beta 3w)/(\beta 2w \cdot \beta 3t) < 2.6 \qquad 3$$

β2w: Zooming rate of the second lens group at the wide-end.

β3w: Zooming rate of the third lens group at the wide-end.

β2t: Zooming rate of the second lens group at the tele-end.

β3t: Zooming rate of the third lens group at the tele-end.

The conditional equation 3 defines a sharing rate for the magnifying power ratio of the second lens group G2 and the third lens group G3. If the sharing rate exceeds a lower limit of the conditional equation 3, the third lens group G3 relatively shares more magnifying power ratio, so that it becomes difficult to absorb the aberration drift by assembling the third lens group G3 configured with only one piece of lens when the zooming rate is changed. In addition, when the focusing is carried out by the third lens group G3, it is undesirable because a change of a chromatic aberration becomes unacceptable by protracting the lenses.

On the other hand, when the sharing rate of the magnifying power by the second lens group G2 becomes large beyond the upper limit of the conditional equation 3, the shift is necessary for zooming rate change increases, and deteriorates the miniaturization of the lens. It is possible to accomplish optimizations of each of refracting power of the second lens group G2 and the third lens group G3, and to easily carry out the aberration correction by properly allocating the magnifying power to the third lens group G3 as suggested by the conditional equation 3 when the zooming rate is changed.

In the zoom lens according to the present invention, the third lens group G3 composes a piece of convergent lens L8 (a convex lens), and corrects a dislocation of the image plane caused by zooming rate change done by moving back and forth along with the optical axis when the zooming rate is changed. This is configured with a piece of lens as mentioned above, so that it is practical to shorten the length on the optical axis required to a collapsible zoom lens when retracted, and to make a focusing mechanism simple.

However, if the third lens group G3 is formed with one piece lens, it becomes difficult to correct the chromatic aberration of magnification occurring at focusing and the curvature of field occurring to over side. This introduces a new problem that requires to put this aberration or curvature within a proper range. Accordingly, in one embodiment of the present invention, the original lens L8 in the third lens group G3 is configured so as to satisfy the conditional equation 1.

In addition, if the conditional equation 1 is not satisfied, and the Abbe's number becomes small, it becomes difficult to put a chromatic aberration of magnification within a permissible value by protracting the lens, particularly in case of focusing at the tele-end. On the contrary, if the conditional equation 1 is not satisfied, and the Abbe's number becomes large, this is desirable with respect to the chromatic aberration. But in this case, since the index of refraction of the commercially available glass material are to be small, the radius of curvature for the lens of the third lens group becomes small, and particularly, the curvature of field at the tele-end remarkably falls down to the under side, so that it becomes difficult to compensate by other lens group. In addition, it is desirable to satisfy the following conditional equation 4.

$$2.2 < f3/fw < 3.0 \qquad 4$$

f3: Focal length of the third lens group.
fw: Focal length at the tele-end.

In addition, if a focal length of the third lens group G3 becomes longer by exceeding an upper limit of the conditional equation 4, a moving distance necessary for focusing increases when the focusing is carried out with the third lens group G3, so that this is not desirable because a change of the aberration in a short distance increases. On the contrary, when the focal length becomes shorter by exceeding a lower limit of the conditional equation 4, it is not favorable because this makes, particularly, the first lens group larger, and deteriorates the compactness of the optical system.

Now, a first example and a second example are shown as numerical examples of a zoom lens according to the embodiment of the present invention. In each of the examples, an aspherical surface is expressed with an equation (1) below, wherein an X-axis is taken in a direction of an optical axis as a coordinate, a height in a direction vertical to the optical axis is H, a conic constant is K, a radius of curvature is R, fourth, sixth, eighth and tenth aspherical surface coefficients are A, B, C, and D, respectively.

$$X = \frac{\frac{h^2}{r}}{1 + \sqrt{1 - (1+k)\frac{h^2}{r^2}}} + Ah^4 + Bh^6 + Ch^8 + Dh^{10} \qquad (1)$$

Figure 3:
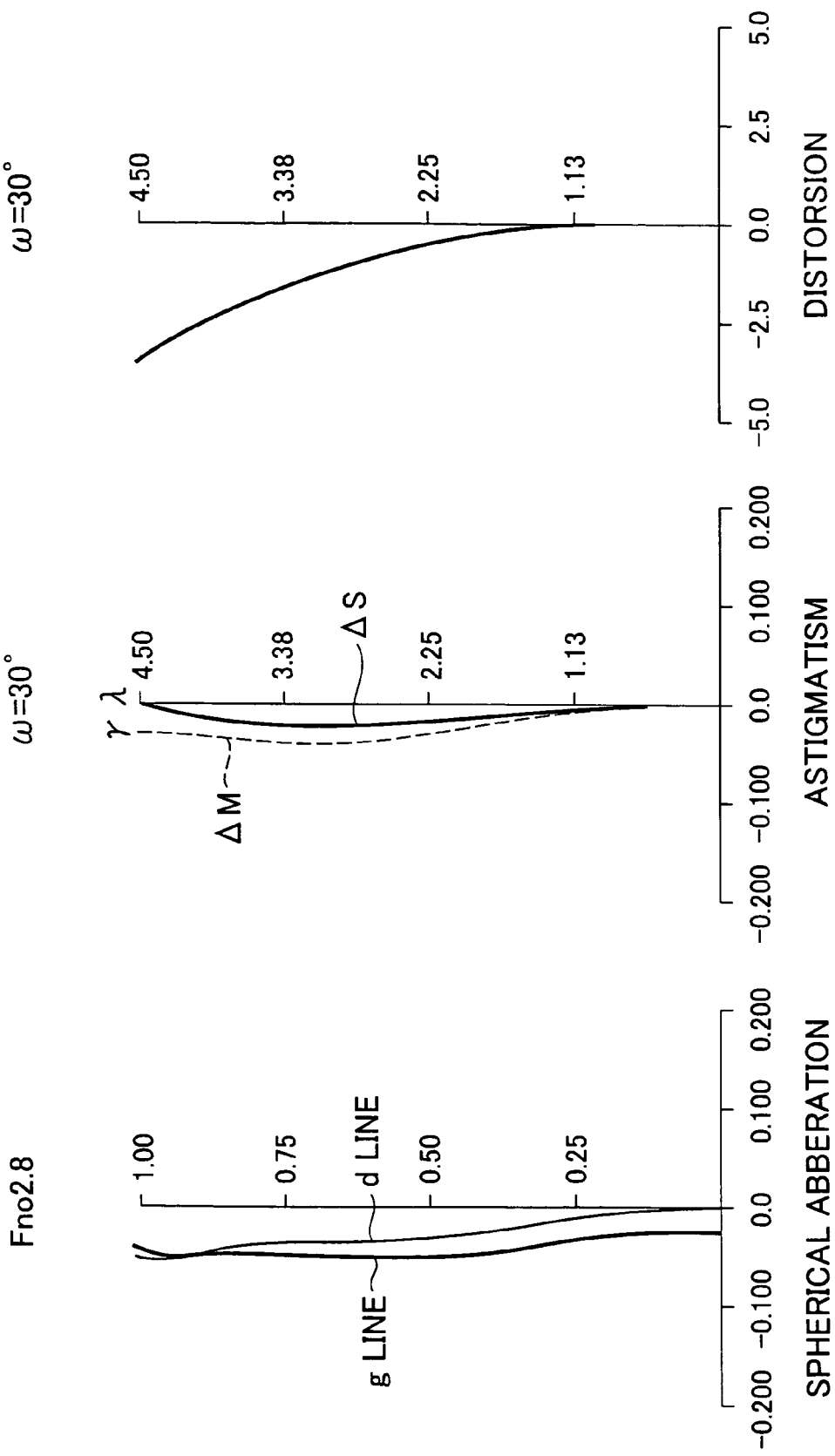
FIG. 3 is a chart of aberration at a wide-end of a zoom lens concerning the first example.
Figure 4:
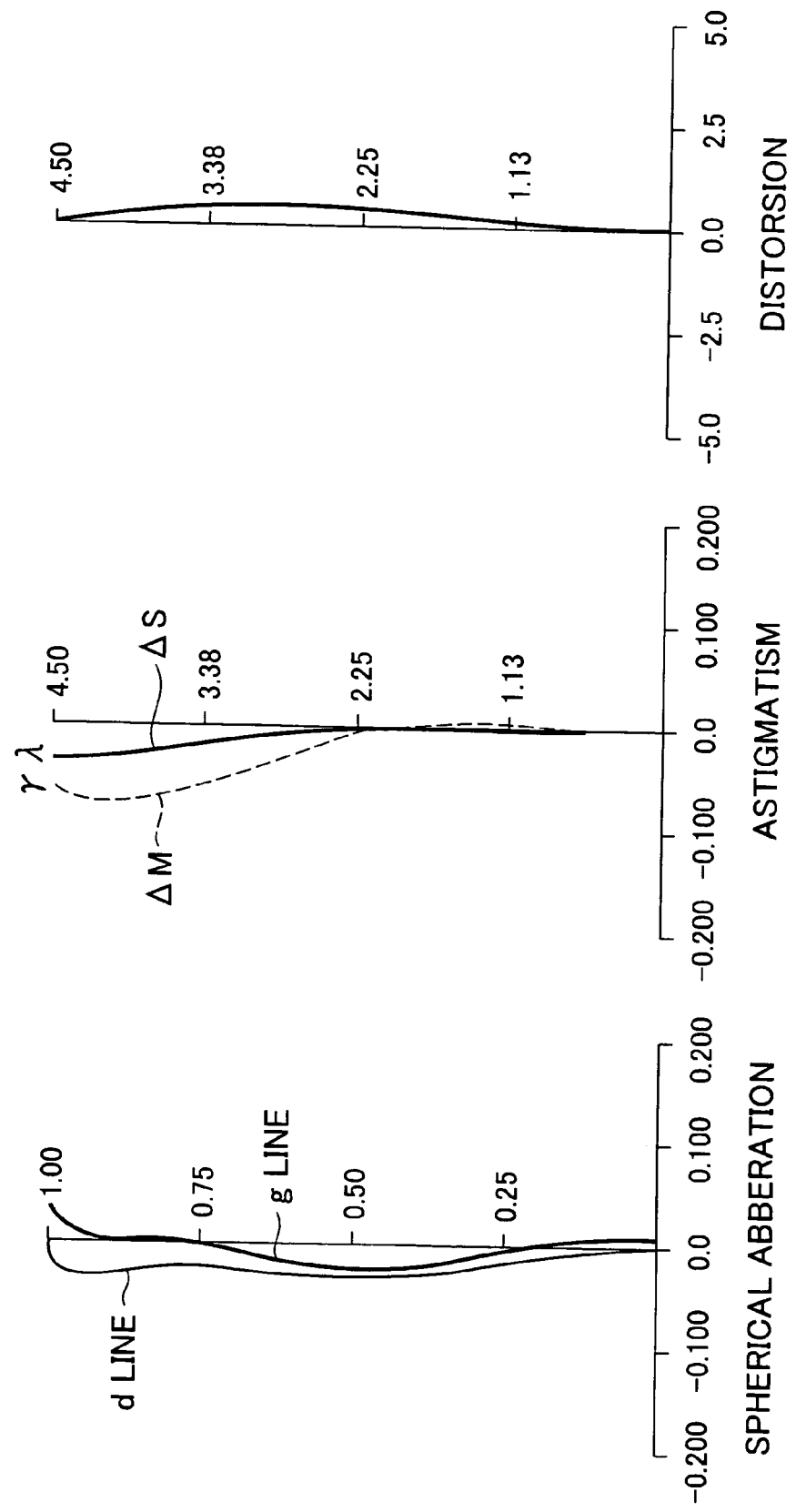
FIG. 4 is a chart of aberration in an intermediate focal length of a zoom lens concerning the first example.
Figure 5:
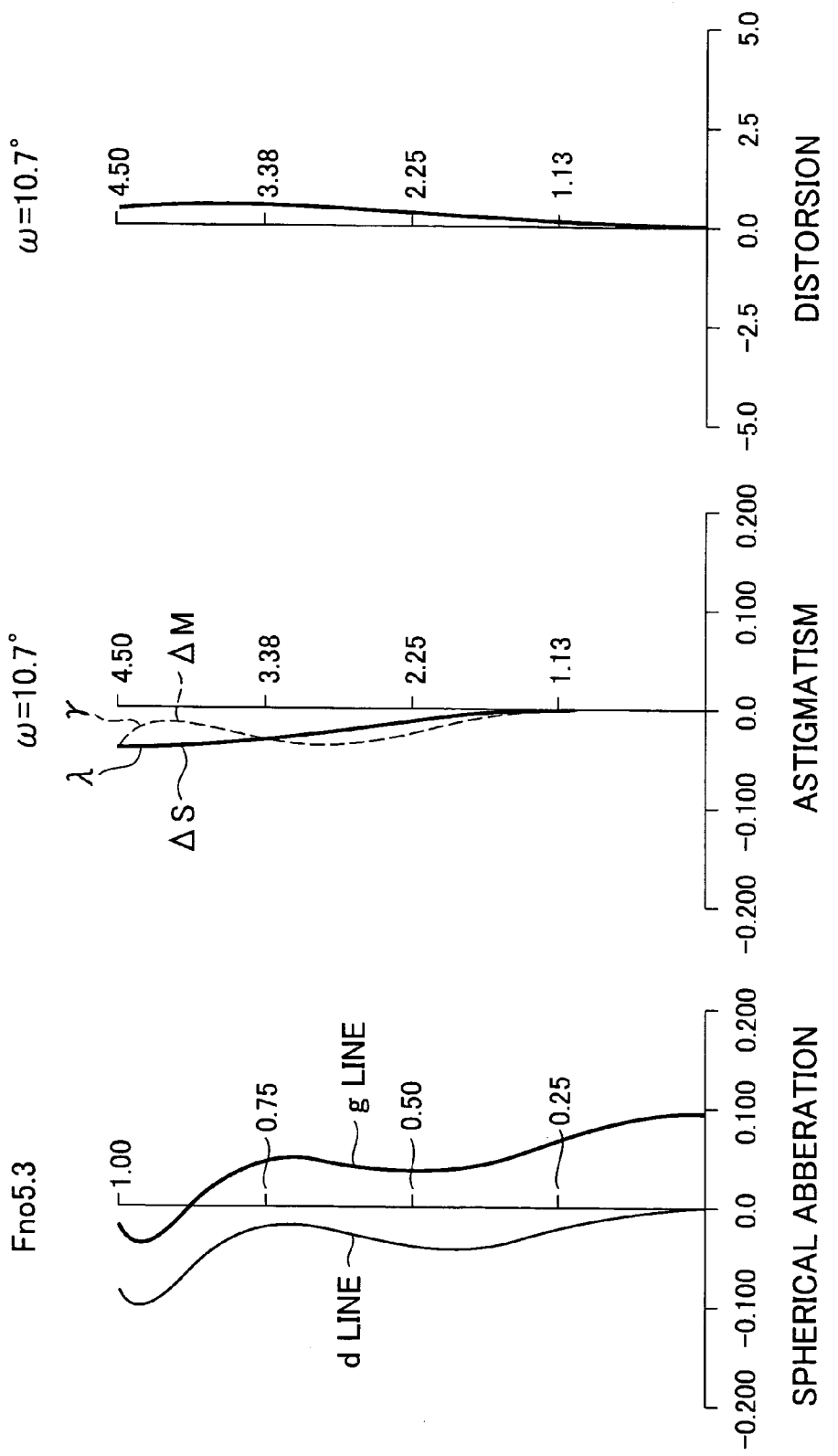
FIG. 5 is a chart of aberration at a tele-end of a zoom lens concerning the first example.
Figure 7:
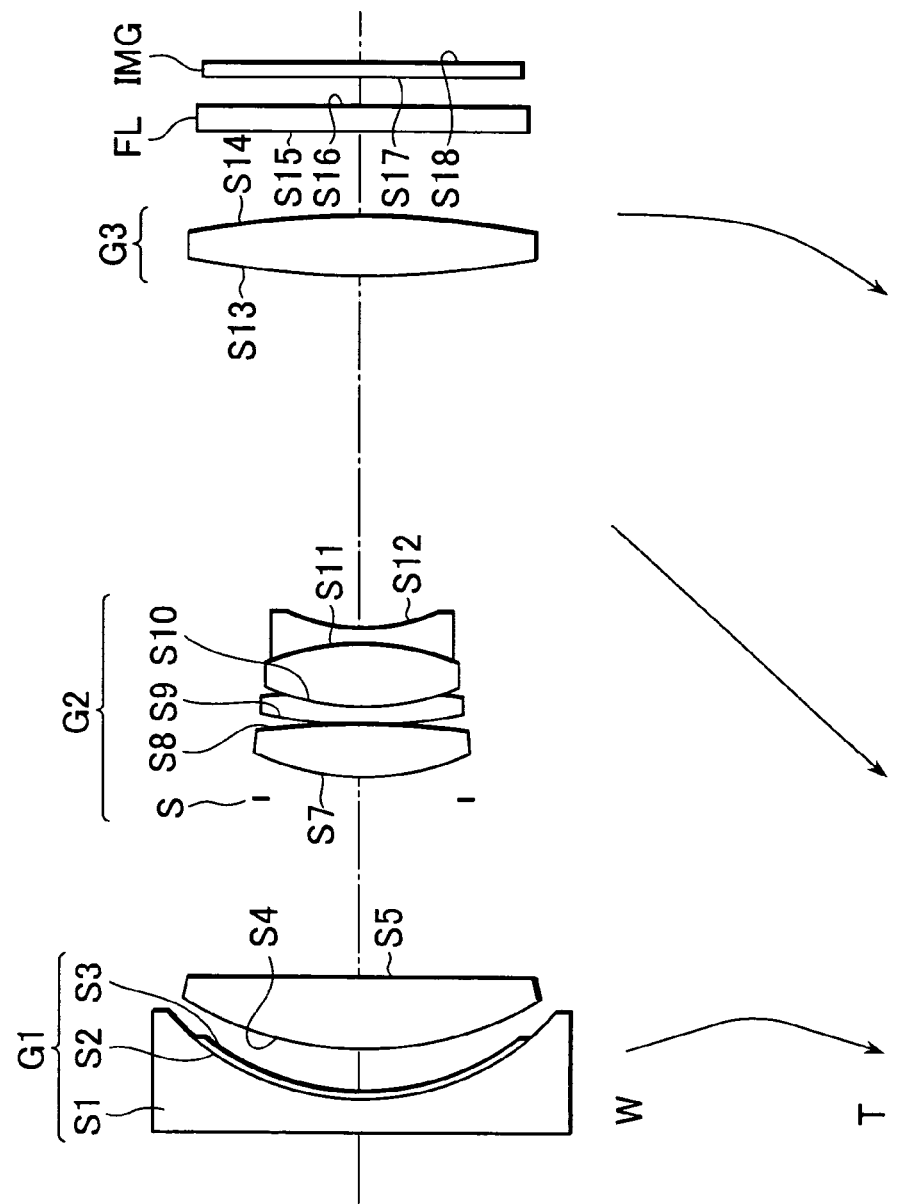
FIG. 7 is a chart showing a configuration of a zoom lens concerning the second example.
Figure 8:
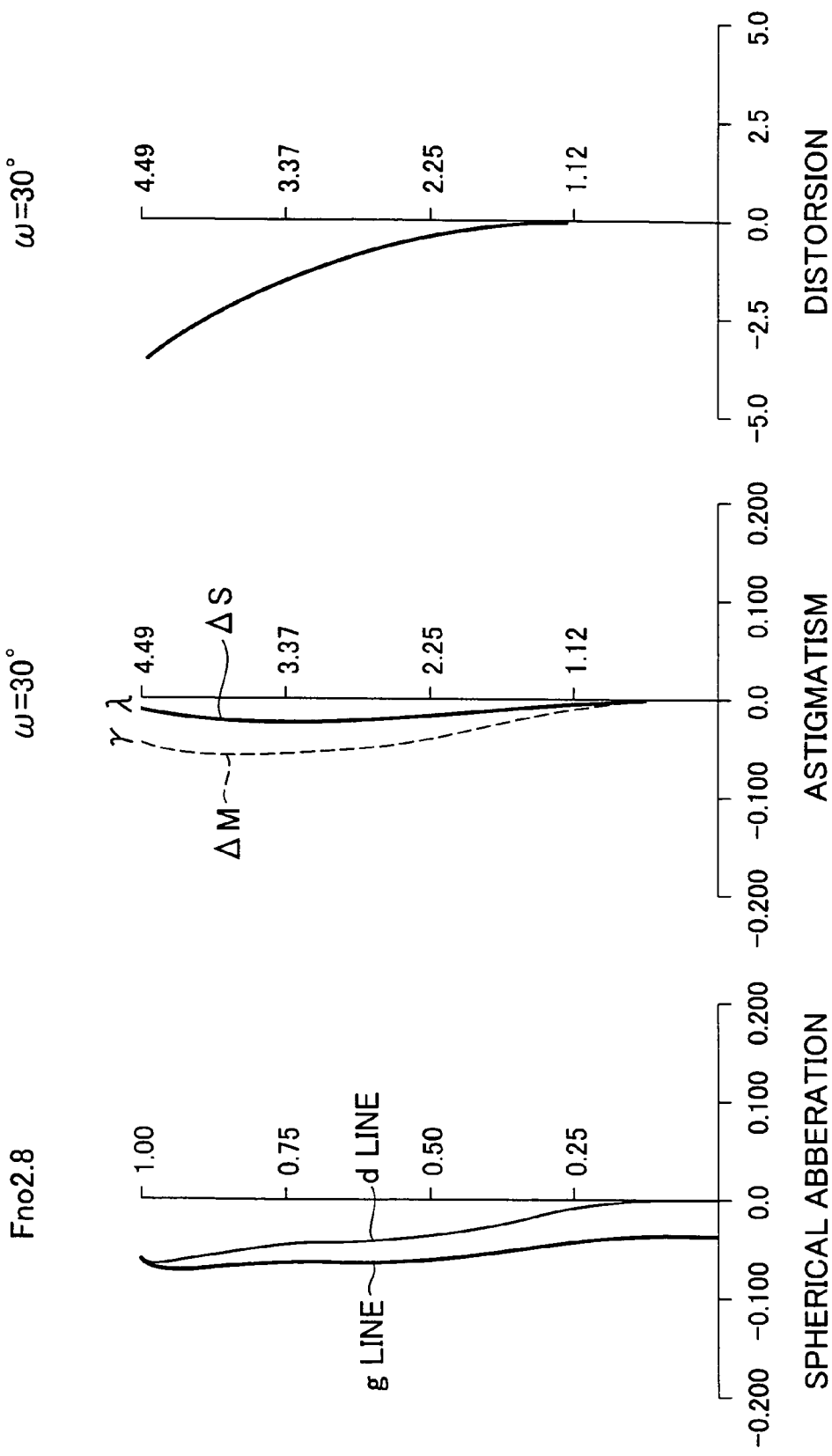
FIG. 8 is a chart of aberration at a wide-end of a zoom lens concerning the second example.
Figure 9:
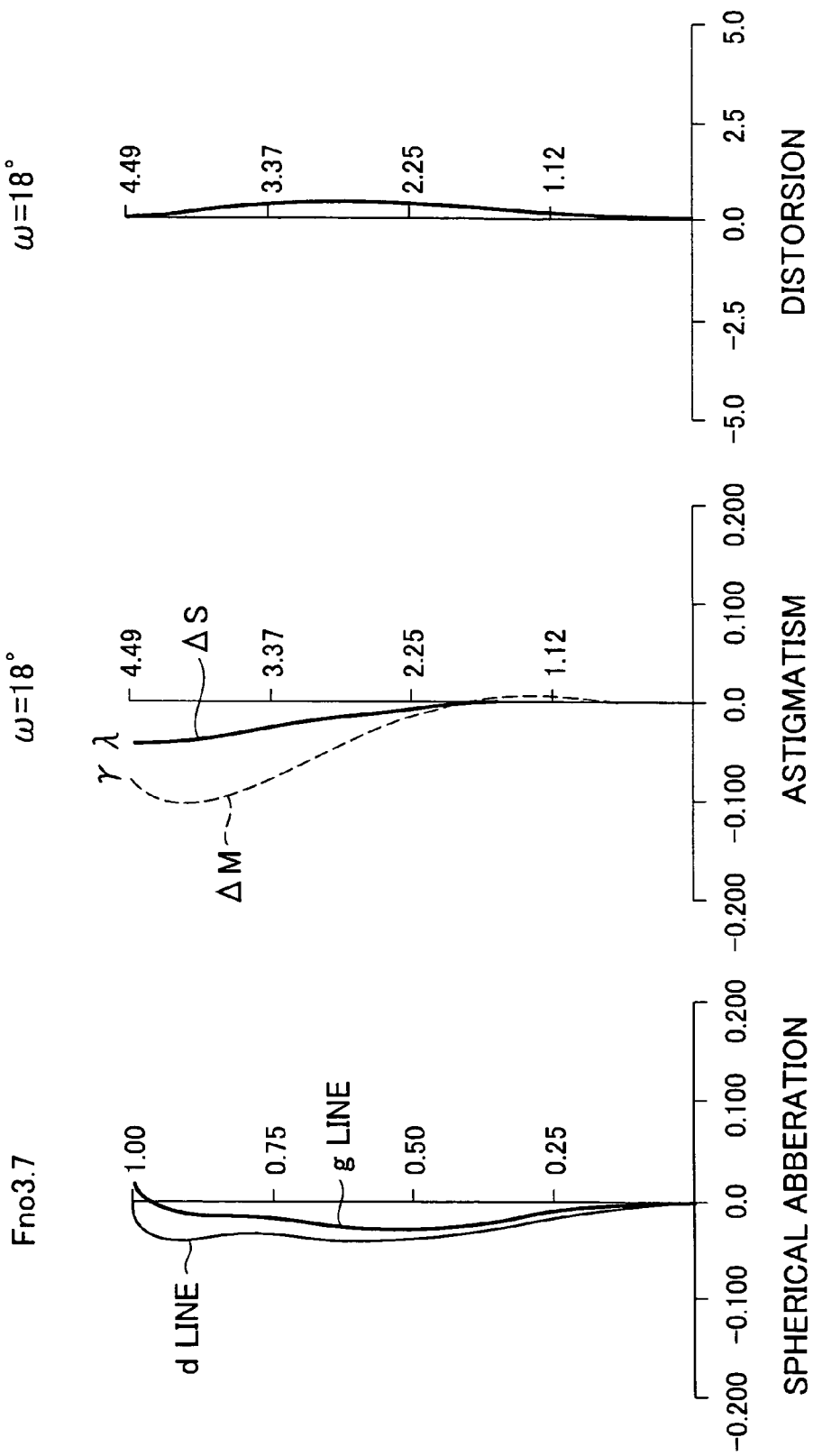
FIG. 9 is a chart of aberration in an intermediate focal length of a zoom lens concerning the second example.
Figure 10:
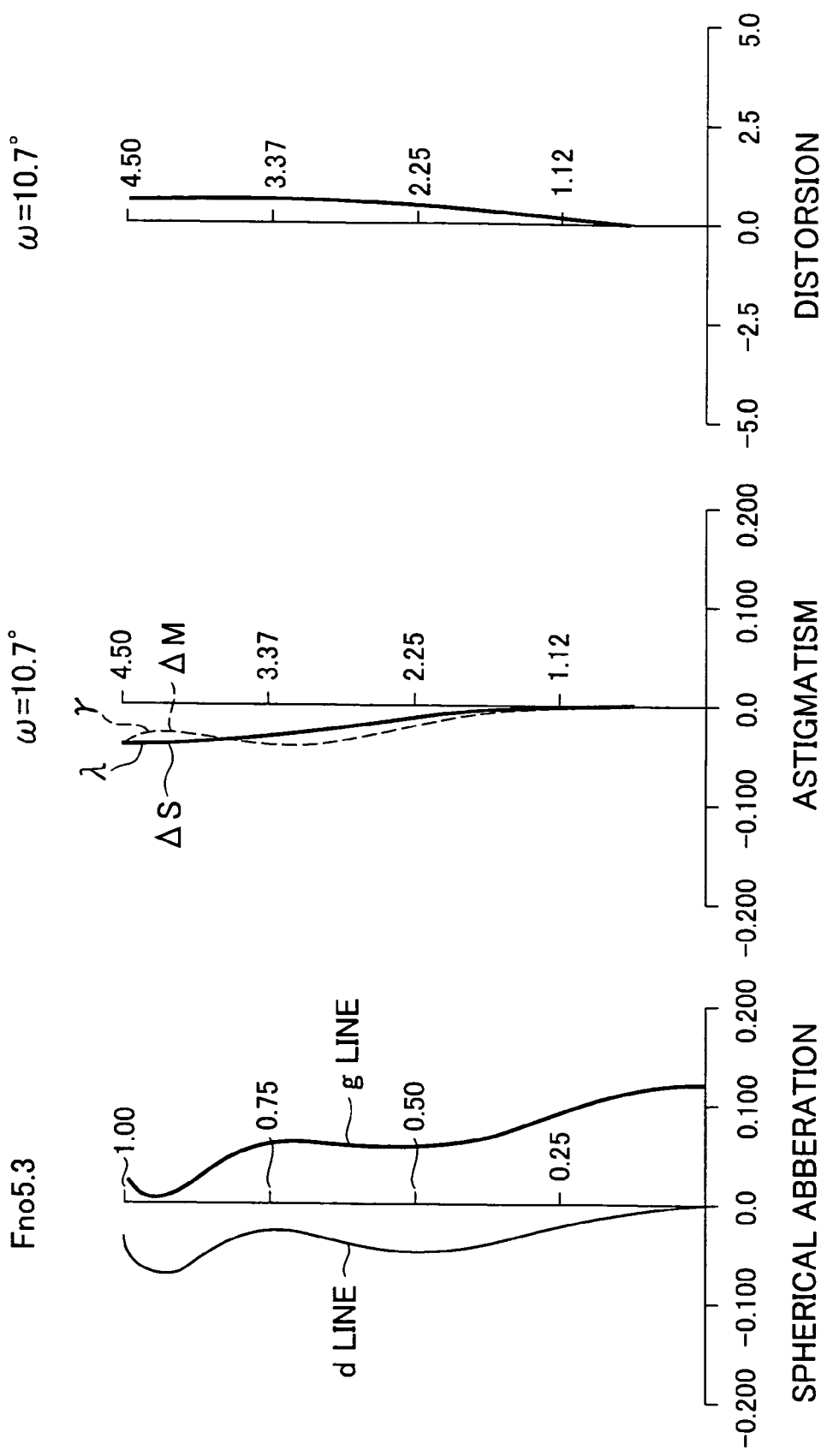
FIG. 10 is a chart of aberration at a tele-end of a zoom lens concerning the second example.

In FIG. 3 to FIG. 5, FNo is an F number, and ω is a half field angle. In addition, a vertical scale of a chart designating a spherical aberration is a release F value, a horizontal scale is a focus, a d line is of a wavelength of 587.6 nm, and a g line is of a wavelength of 435.8 nm. In addition, a vertical scale of a chart designating an astigmatism is a height of an image, a horizontal scale is a focus, ΔS is a sagittal, ΔM designates an image plane of meridional. Further, a vertical scale of a chart designating distortion is a height of the image, and a horizontal scale is %.

Figure 2:
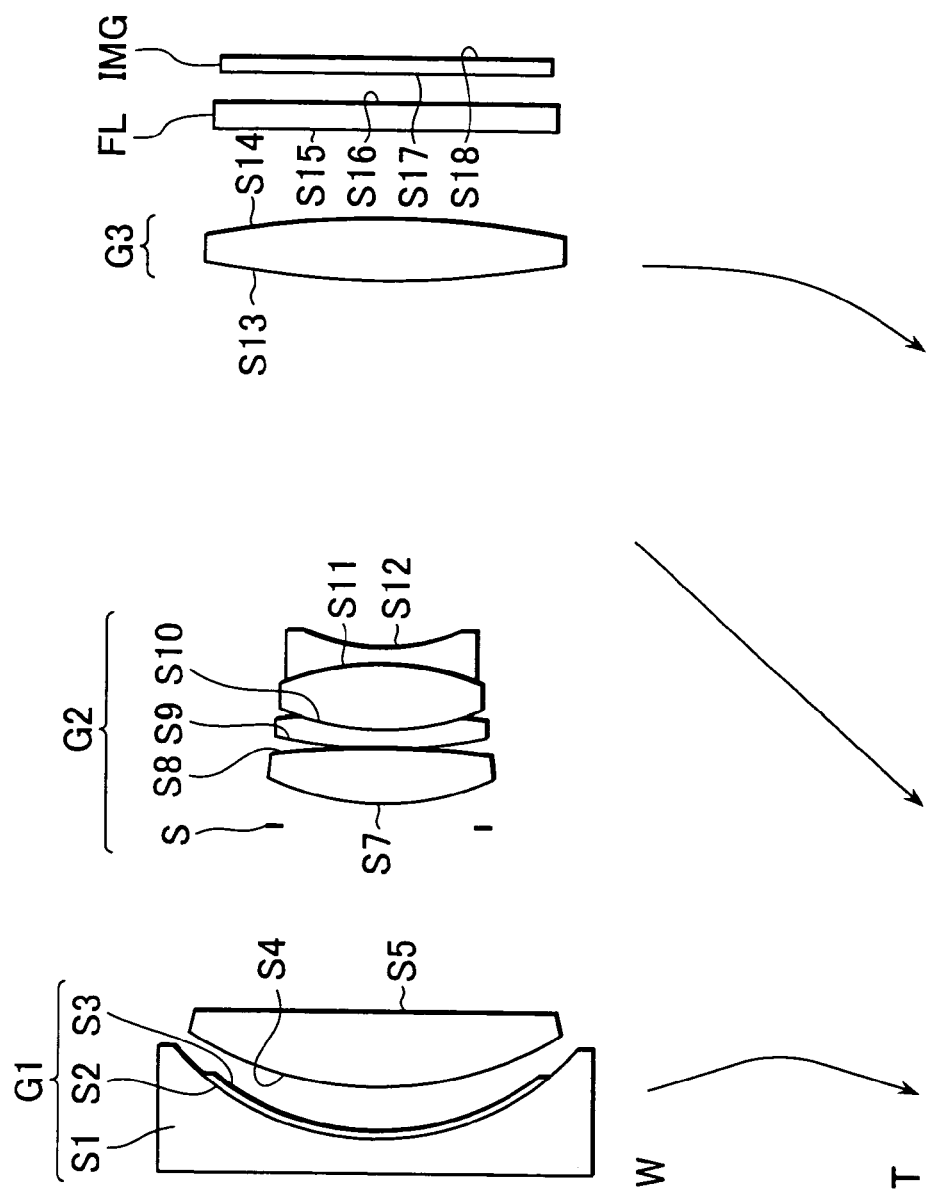
FIG. 2 is a chart showing a configuration of a zoom lens concerning the first example.

In addition, a surface No. in FIG. 6 is the number of the lens surfaces from the object side in FIG. 2, R is a radius of curvature, D is a space between lens surfaces, Nd is an index of refraction relative to the d line, and vd designates Abbe's number. Further, K, A, B, C, and D as parameters designating an aspherical surface correspond to each of parameters in the equation (1). Sill further, in intervals of lens groups A1, B2, C3, the A1 designates a space between the first lens group and the second lens group (a space between the lens surface S5 and the iris S), the B2 designates a space between the second lens group and the third lens group (a space between the lens surface S12 and the lens surface S13), and the C3 designates a space between the third lens group and the FL (a space between the lens surface S14 and the filter surface S15).

What is claimed is:

1. A zoom lens comprising sequentially from an object side:
    a first lens group having an negative refracting power, and being movable back and forth along with an optical axis when a zooming rate is changed;
    a second lens group having a positive refracting power, and being movable to the object side along with the optical axis when the zooming rate is changed from a wide-end to a tele-end; and
    a third lens group movable back and forth along with the optical axis, and having a positive refracting power, wherein;
    said second lens group includes sequentially from the object side;
    an iris;
    a one piece convergent lens having at least a surface facing to the object side being an aspherical surface; and
    an three adhered lenses, wherein;
    said first lens group includes;
    an negative meniscus lens having a complex aspherical surface at an image plane side; and
    a convergent lens.

2. The zoom lens as cited in claim 1, wherein;
    said third lens group includes;
    a one piece convergent lens having at least one or more of aspherical surfaces.

3. The zoom lens as cited in claim 2, wherein;
    the convergent lens of the third lens group satisfies the following conditions:

n>1.5 and 45<v<70, wherein n is a d-line refractive index of glass material of the convergent lens of the third lens group, and ν is an Abbe's number of glass material of the convergent lens of the third lens group.

4. An imaging apparatus mounted with a zoom lens, said zoom lens comprising sequentially from an object side:

a first lens group having an negative refracting power, and being movable back and forth along with an optical axis when a zooming rate is changed;

a second lens group having a positive refracting power, and being movable to the object side along with the optical axis when the zooming rate is changed from a wide-end to a tele-end; and a third lens group movable back and forth along with the optical axis, and having a positive refracting power, wherein;

said second lens group includes sequentially from the object side;

an iris;

a one piece convergent lens having at least a surface facing to the object side being an aspherical surface; and three adhered lenses, wherein;

said first lens includes;

an negative meniscus lens having a complex aspherical surface at an image plane side; and a convergent lens.

5. The imaging apparatus as cited in claim 4, wherein;

said third lens group includes;

a one piece convergent lens having at least one or more of aspherical surfaces.

6. The imaging apparatus as cited in claim 5, wherein;

the convergent lens of the third lens group satisfies the following conditions:

$n > 1.5$ and $45 < \nu < 70$, wherein n is a d-line refractive index of glass material of the convergent lens of the third lens group, and ν is an Abbe's number of glass material of the convergent lens of the third lens group.

* * * * *

UNITED STATES PATENT AND TRADEMARK OFFICE
CERTIFICATE OF CORRECTION

PATENT NO. : 7,050,242 B2  Page 1 of 1
APPLICATION NO. : 10/832298
DATED : May 23, 2006
INVENTOR(S) : Nobuyuki Adachi It is certified that error appears in the above-identified patent and that said Letters Patent is hereby corrected as shown below:

Column 8, Line 2, insert -- group -- after "lens"

Signed and Sealed this

Ninth Day of January, 2007

JON W. DUDAS
*Director of the United States Patent and Trademark Office*